(12) United States Patent
Tancevski et al.

(10) Patent No.: US 7,756,018 B2
(45) Date of Patent: Jul. 13, 2010

(54) SYSTEM AND METHOD FOR IMPLEMENTING FAST LAYER 2 PROTECTION IN PASSIVE OPTICAL NETWORKS

(75) Inventors: Ljubisa Tancevski, Dallas, TX (US); An Ge, Plano, TX (US); Jessy V. Rouyer, Ft. Worth, TX (US); Nicolas Le Sauze, Bures-sur-Yvette (FR)

(73) Assignee: Alcatel Lucent, Paris (FR)

( * ) Notice: Subject to any disclaimer, the term of this patent is extended or adjusted under 35 U.S.C. 154(b) by 777 days.

(21) Appl. No.: 11/265,866

(22) Filed: Nov. 3, 2005

(65) Prior Publication Data

US 2007/0097859 A1 May 3, 2007

(51) Int. Cl.
*H04J 1/16* (2006.01)
(52) U.S. Cl. .................. 370/228; 370/248; 370/242
(58) Field of Classification Search ......... 370/216–229, 370/248–252, 400, 404–406, 360, 394, 395.3, 370/22, 241, 242; 398/58, 168
See application file for complete search history.

(56) References Cited

U.S. PATENT DOCUMENTS 5,896,474 A * 4/1999 Van Deventer et al. ........ 385/24
6,658,013 B1 * 12/2003 de Boer et al. .............. 370/404
6,813,241 B1 * 11/2004 Wang et al. ................. 370/228
7,289,428 B2 * 10/2007 Chow et al. ................. 370/216
2003/0152389 A1 * 8/2003 Sala et al. ..................... 398/98
2004/0109450 A1 * 6/2004 Kang et al. .................. 370/390

FOREIGN PATENT DOCUMENTS

| EP | 0803996 A1 | 10/1997 |
|---|---|---|
| EP | 1176765 A1 | 1/2002 |
| WO | 9534182 A1 | 6/1995 |
| WO | 9851050 A1 | 11/1998 |

* cited by examiner

*Primary Examiner*—Jason E Mattis
*Assistant Examiner*—Dady Chery
(74) *Attorney, Agent, or Firm*—Garlick Harrison & Markison; Jessica W. Smith

(57) ABSTRACT

System and method for providing fast protection in a passive optical network ("PON") including two central hubs and a plurality of network nodes, wherein the network nodes are connected to a first of the central hubs by a first optical path and to a second of the central hubs by a second optical path. The method comprises setting the first and second central hubs to master mode and slave mode, respectively, such that only the first central hub transmits traffic to and from the network nodes; detecting a failure in the first optical path; exchanging status information between the first and second central hubs; and if no failure has occurred in the second optical path, setting the first and second central hubs to slave mode and master mode, respectively, such that only the second central hub transmits traffic to and from the network nodes.

16 Claims, 4 Drawing Sheets

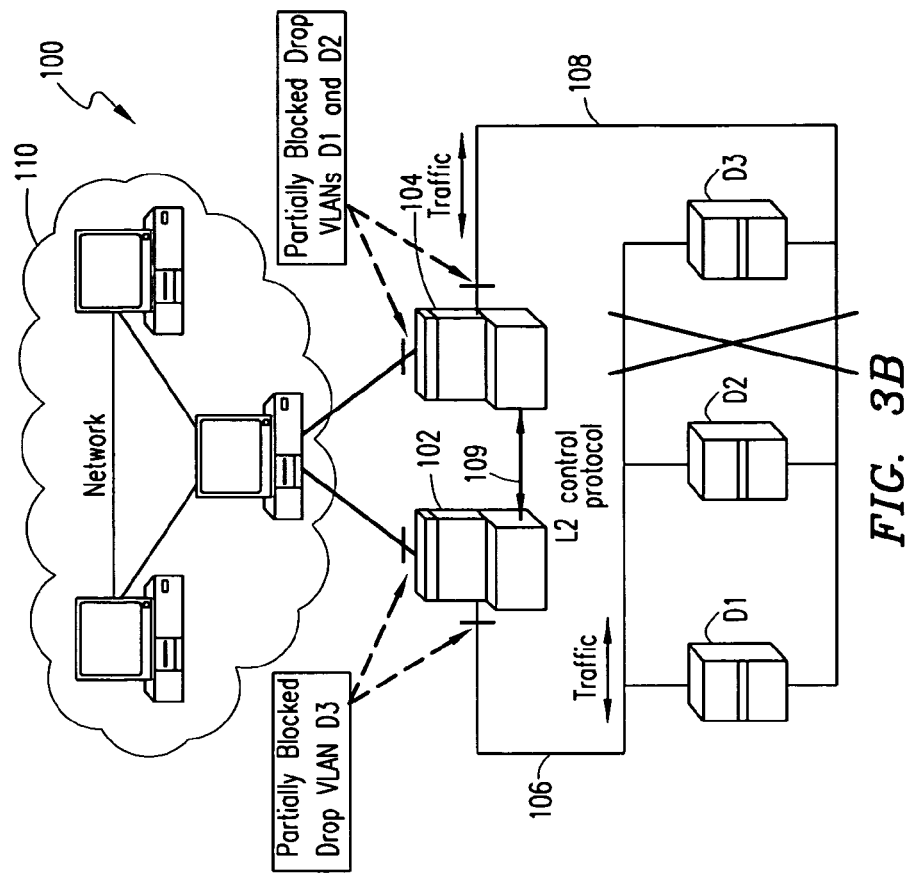
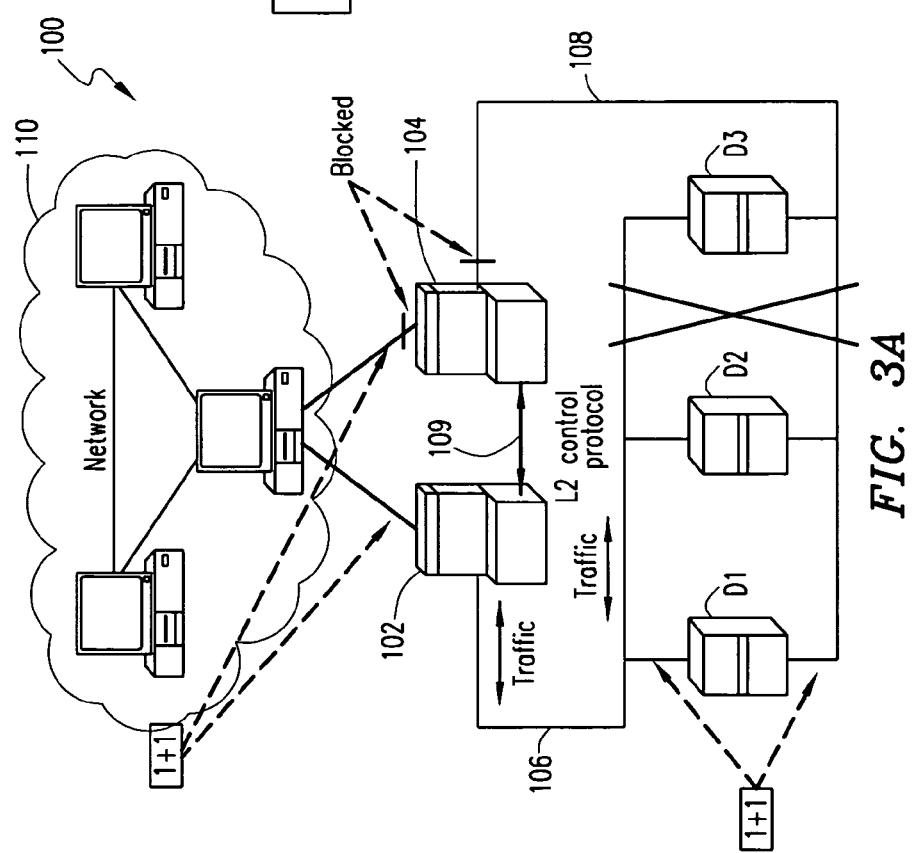

SYSTEM AND METHOD FOR IMPLEMENTING FAST LAYER 2 PROTECTION IN PASSIVE OPTICAL NETWORKS

BACKGROUND OF THE INVENTION

1. Technical Field of the Invention

The present invention generally relates to passive optical networks ("PONs"). More particularly, and not by way of any limitation, the present invention is directed to system and method for implementing fast layer 2 ("L2") protection in PONs.

2. Description of Related Art

Wavelength Division Multiplex Passive Optical Networks ("WPONs") rely on shared optical wavelength and unidirectional connections. Ethernet is used as the L2 technology in WPON. To prevent single point of failure, WPON employs dual-hub architecture; as a result, it is necessary to maintain a loop-free topology. However, the standard spanning tree cannot correctly function in such a network.

Currently, the solution to the foregoing problem is to utilize spanning tree protocols ("STP") for providing both a loop-free network and protection. STP and the more recently developed rapid STP ("RSTP") and multiple STP ("MSTP") work efficiently in local area networks (LANS) and switched Ethernet networks for offering network protection at L2. This solution is deficient, however, in that bridges need bi-directional ports to exchange bridge protocol data units ("BPDUs"). Point-to-point connections are required to fully enable fast convergence. WPON is based on broadcast and shared optical bandwidth. Additionally, WPON nodes use asymmetric ports, i.e., some ports have only receivers, for efficient and cost effective data distribution. As a result, the broadcast and asymmetrical nature of the network prevents standard L2 protection schemes from functioning properly.

Therefore, what is needed is a system and method to provide L2 protection for networks that employ broadcast media and asymmetric traffic distribution.

SUMMARY OF THE INVENTION

One embodiment is a method for providing fast protection in a passive optical network ("PON") including two central hubs and a plurality of network nodes connected to a first one of the central hubs by a first optical path and to a second one of the central hubs by a second optical path. The method comprises setting the first and second central hubs to master mode and slave mode, respectively, such that only the first central hub transmits traffic to and from the network nodes; detecting a failure in the first optical path; exchanging status information between the first and second central hubs; and if no failure has occurred in the second optical path, setting the first and second central hubs to slave mode and master mode, respectively, such that only the second central hub transmits traffic to and from the network nodes.

Another embodiment is a system for implementing a fast protection scheme in a passive optical network ("PON") including two central hubs and a plurality of network nodes, wherein the network nodes are connected to a first of the central hubs by a first optical ring and connected to a second of the central hubs by a second optical ring. The system comprises means for setting the first central hub to master mode and the second central hub to slave mode such that only the first central hub transmits traffic to and from the network nodes via the first optical ring; means for detecting a failure in the first optical ring; means for exchanging control messages between the first and second central hubs regarding the ring status of the first and second optical rings; means for setting the second central hub to master mode and the first central hub to slave mode such that only the second central hub transmits traffic to and from the network nodes via the second optical ring if no failure has occurred in the second optical ring.

Another embodiment is a passive optical network ("PON") for implementing a fast protection scheme. The PON comprises a first central hub connected to a plurality of network nodes via a first optical ring; a second central hub connected to the network nodes via second optical ring, the second central hub connected to the first central hub via a connection for enabling periodic exchange of ring status information between the hubs; wherein the first central hub is set to master mode and the second central hub is set to slave mode such that only the first central hub transmits traffic to and from the network nodes; wherein responsive to detection of a failure in the first optical ring, if no failure has occurred in the second optical ring, setting the first and second central hubs to slave mode and master mode, respectively, such that only the second central hub transmits traffic to and from the network nodes.

BRIEF DESCRIPTION OF THE DRAWINGS

A more complete understanding of the present invention may be had by reference to the following Detailed Description when taken in conjunction with the accompanying drawings wherein:

FIGS. 3A and 3B illustrate a response of an embodiment to a cable cut in the PON of FIG. 1;

DETAILED DESCRIPTION OF THE DRAWINGS

Figure 1:
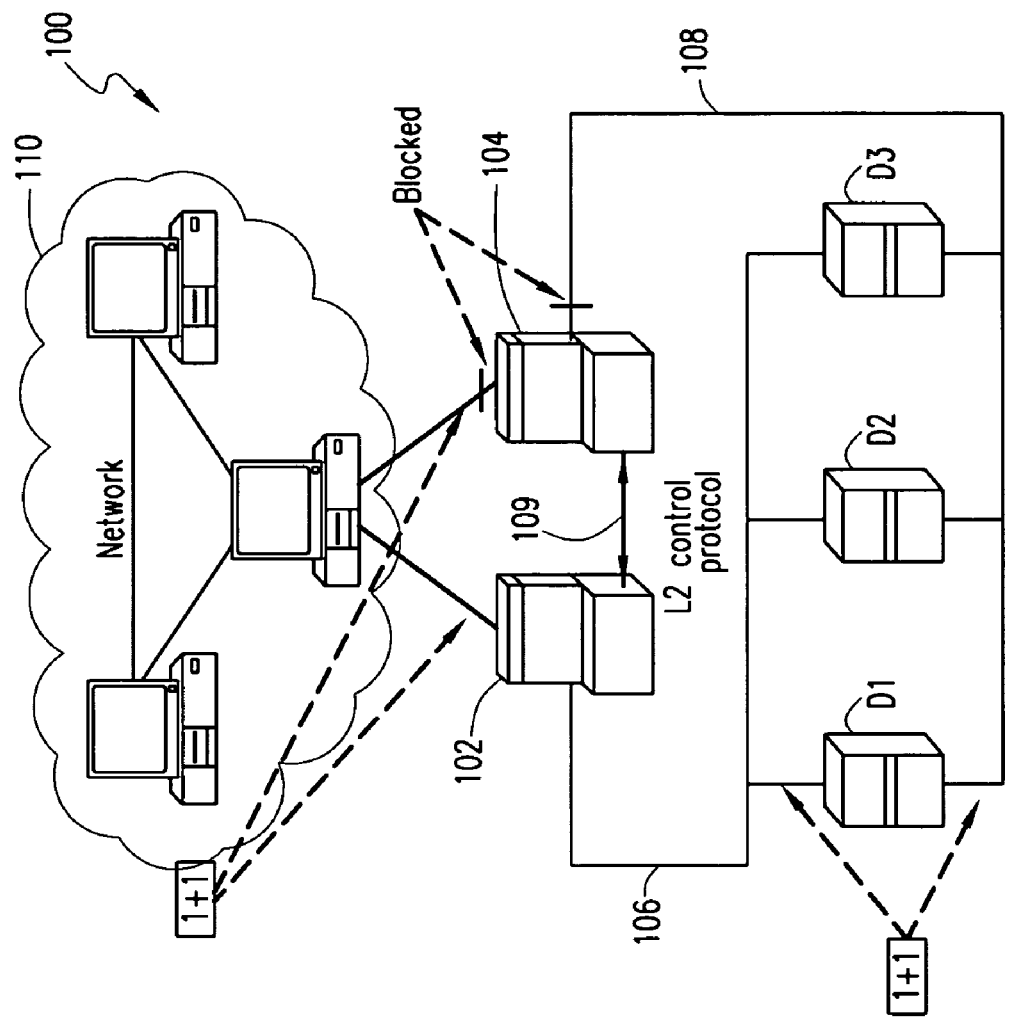
FIG. 1 depicts a system block diagram of an exemplary PON for implementing an embodiment.

Embodiments of the invention will now be described with reference to various examples of how the invention can best be made and used. Like reference numerals are used throughout the description and several views of the drawings to indicate like or corresponding parts, wherein the various elements are not necessarily drawn to scale.

In general, a fast L2 protection scheme for a PON is proposed herein. Using a dual hub WPON as an example, in this approach, one of the hubs is in master mode, while the other is in slave mode. Two hubs using the proposed L2 protocol exchange underlying WPON topology status. During normal operation, only the master hub forwards traffic to and from the network nodes. When a failure occurs in a working path, or ring, of the network, the master hub detects the failure and immediately informs the slave hub to take over the traffic on the working links. At the same time, the master node stops forwarding the corresponding traffic to/from the network nodes to avoid duplication.

Referring now to FIG. 1, illustrated therein is an exemplary WPON 100 for implementing an embodiment described herein. It should be recognized that, although the embodiment is illustrated as comprising a WPON, any type of PON may be used to implement the embodiments described herein. As shown in FIG. 1, the WPON 100 comprises two hubs 102, 104, two optical paths, or rings 106, 108, and a plurality of network nodes, represented in the FIGS. by three nodes D1-D3, attached to both rings 106, 108. In one embodiment, the nodes D1-D3 are digital subscriber line access multiplexers ("DSLAMs"). Each node D1-D3 has one dedicated upstream channel on each ring 106, 108. Downstream traffic is delivered to the nodes D1-D3 via the rings 106, 108, using shared wavelength. Traffic belonging to the same one of the nodes D1-D3 is assigned to the same virtual local area network ("VLAN"), with the exception of broadcast TV ("BTV") traffic, which uses specific broadcast VLANs seen by all of the nodes D1-D3.

Gigabit Ethernet ("GE") ports (not shown) are installed at the hubs 102, 104, and nodes D1-D3 to send and receive Ethernet frames. Thus, a loop-free active topology is required in the WPON 100. However, as previously indicated, WPON uses, either fully or partially, shared wavelength for downstream traffic (i.e., from hub to node) and a dedicated wavelength for upstream traffic (i.e., from node to hub). Besides the BTV traffic, as previously indicated, the WPON 100 utilizes the asymmetric and unidirectional GE ports present at both the hubs 102, 104, and nodes D1-D3. As a result, spanning tree protocols, which require bidirectional links and supporting ports, cannot operate correctly on a network such as the WPON 100.

In accordance with features of one embodiment, a fast L2 protection scheme is proposed in which each hub 102, 104, has a detection mechanism for detecting possible failures on one or both of the rings 106, 108. One of the hubs, e.g., the hub 102, is in master mode and the other hub, e.g., the hub 104, is in slave mode. By definition herein, the ring connected to the master hub is designated the working ring and the ring connected to the slave hub is designated the protection ring. The hubs 102, 104, periodically exchange underlying WPON topology status information using L2 control protocol via a connection 109. In particular, the hubs 102, 104, exchange status information regarding the status of the rings 106, 108. Traffic from a provider network 110 is sent to both hubs 102, 104, using a 1+1 protection scheme. Each node D1-D3 also sends the upstream traffic to both hubs 102, 104, using the 1+1 protection scheme. During normal operation, only the master hub 102 forwards the traffic to/from the nodes D1-D3 via the working ring 106. In contrast, the slave hub 104 drops, or filters out, the traffic that reaches its GE ports.

As will be described in detail below, each of the master and slave hubs 102, 104, determines whether to forward traffic on its corresponding ring 106, 108, respectively, based on the status of the rings. As previously noted, ring status information is periodically exchanged between the hubs 102, 104. The L2 protection method uses 1+1 for redundancy and blocks the slave hub port (i.e., filtering the traffic to and from the WPON 100) to keep the topology loop-free.

When a failure occurs in the working ring 106, the master hub 102 detects the failure based on loss of the optical signal on both upstream and downstream links at the optical layer. A failure in the protection ring 108 is similarly detected by the slave hub 104. Thus, the failure detection and location are fast. In response to detection of such a failure, the hubs 102, 104, exchange ring status information via L2 protocol control messages on the connection 109 as previously described and the protection process is initiated as will be described in greater detail below. In one embodiment, the L2 protocol control message comprises Ethernet/L2 frames. It should be noted that there is no timer involved in this process; rather, convergence time will typically depend primarily on failure detection and the control message processing time at the hubs 102, 104. Accordingly, the embodiments enable the performance of fast protection using the L2 protocol.

Figure 2A:
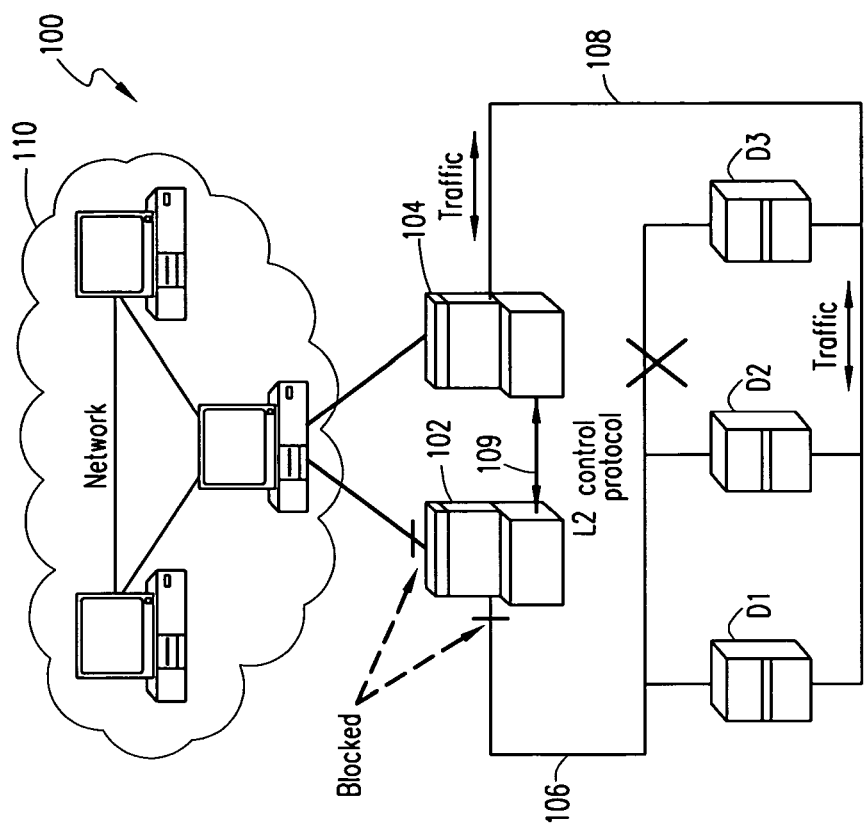
FIGS. 2A and 2B illustrate a response of the embodiment to a link failure in the PON of FIG. 1.
Figure 2B:
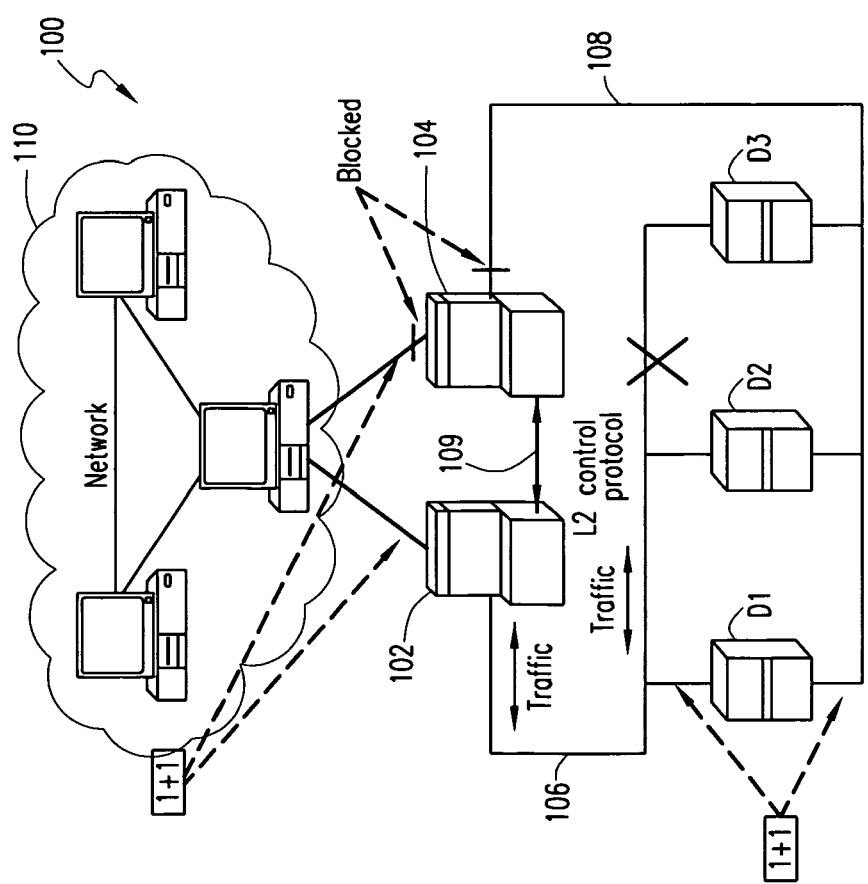

To better understand the operation of the proposed method, examples are presented in FIGS. 2A-2B and 3A-3B, which respectively illustrate a case in which a failure occurs due to a fiber cut (FIGS. 2A-2B) and a cable cut (FIGS. 3A-3B). Referring to FIGS. 2A-2B, which illustrate the fiber cut case, when a fiber cut occurs in the working ring 106, e.g., between nodes D2 and D3, the master hub 102 detects the loss of downstream optical signals at the closing end of the ring 106 and the loss of the upstream signal from the node D3. As a result, the master hub 102 stops forwarding traffic via the working ring 106 and informs the slave hub 104, via an L2 control protocol message, to start forwarding traffic via the protection ring 108. As illustrated in FIG. 2B, as a result, the ports of the hub 102 are blocked, the ports of the hub 104 are unblocked, and traffic is routed to and from the network 110 via the hub 104. Additionally, traffic is routed between the hub 104 and the nodes D1-D3 via the ring 108.

Referring now to FIGS. 3A and 3B, which illustrate the cable cut case, assuming a cable cut occurs between the nodes D2 and D3, thereby affecting both rings 106, 108, both hubs 102, 104, need to forward the correct VLAN traffic via both rings 106, 108. In particular, when the master hub 102 detects the loss of downstream optical signals at the closing end of the ring 106 and the loss of the upstream signal from the node D3 and the slave hub 104 detects the loss of upstream optical signals from the nodes D1 and D2, the hubs exchange L2 control protocol messages to advise the other regarding the status of their respective ring. As a result, as illustrated in FIG. 3B, the ports of the hub 102 are partially blocked such that the VLAN corresponding to the node D3 is dropped. Similarly, the ports of the hub 104 are partially blocked such that the VLAN corresponding to nodes D1 and D2 is dropped. As a result, traffic to and from the node D3 is routed via the hub 104 and the ring 108, while traffic to and from the nodes D1 and D2 is routed via the hub 102 and the ring 106.

Figure 4:
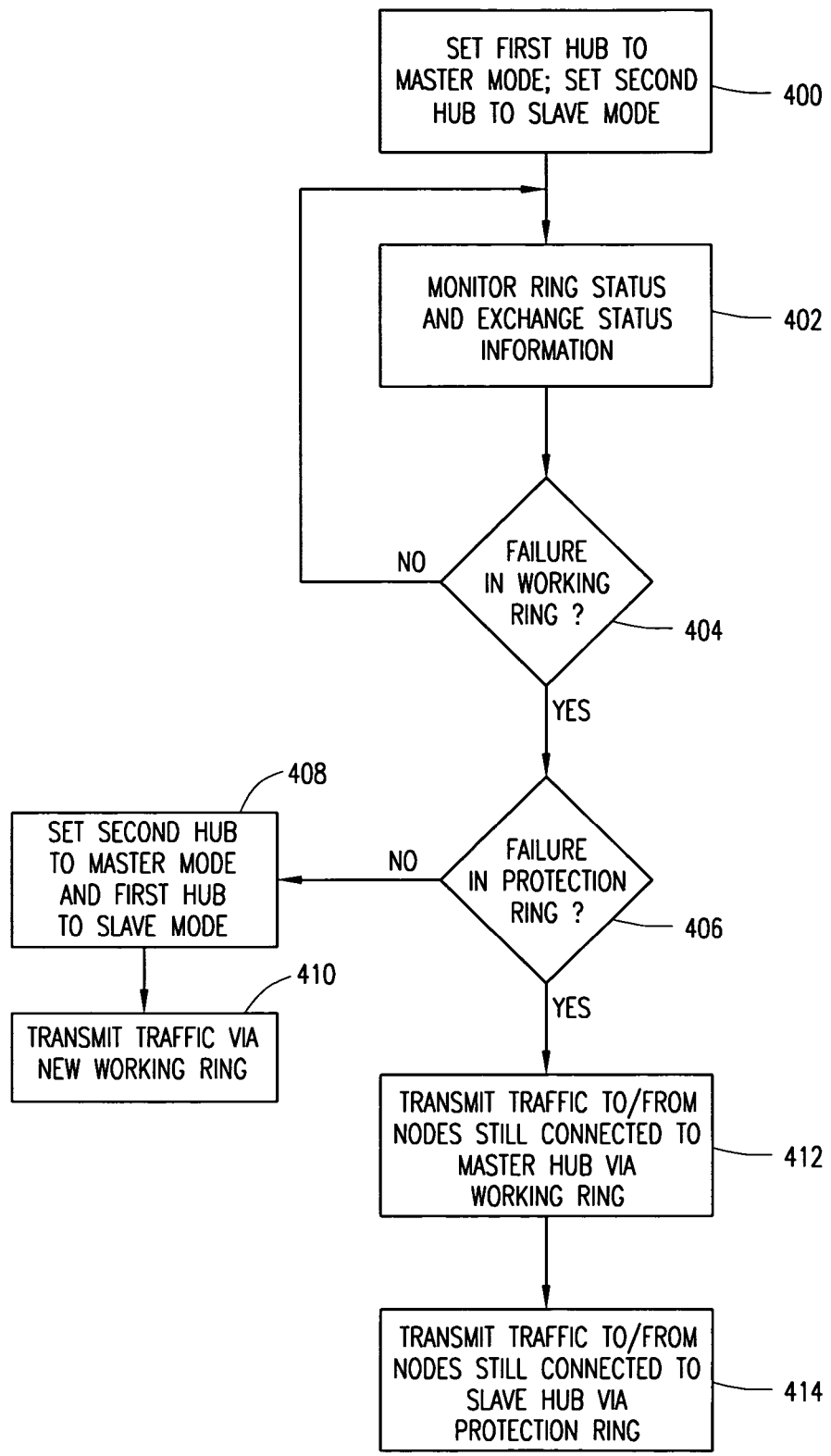
FIG. 4 is a flowchart of the operation of a fast L2 protection scheme for a PON in accordance with one embodiment.

FIG. 4 is a flowchart of the operation of an embodiment for providing fast L2 protection in a PON, such as the WPON 100. Initially, one of two hubs is set to master mode and the other is set to slave mode (block 400). The hubs monitor the status of the rings and periodically exchange status information using, for example, Ethernet/L2 frames (block 402). Responsive to detection of a failure in the working ring (block 404), if the protection ring has not failed (block 406), the hub currently set to master mode is set to slave mode, while the hub currently set to slave mode is set to master mode (block 408) and traffic is blocked from transmission via the failed ring (i.e., the previous working ring) and is transmitted via the new working ring (i.e., the ring connected to the new master hub) (block 410).

If failures are detected in both the working ring (block 404) and the protection ring (block 406) (i.e., if the cable is cut), the master hub is partially blocked such that only traffic to and from nodes still connected to the master hub is transmitted via the working ring (block 412). Similarly, the slave hub is partially blocked such that only traffic to and from nodes still connected to the slave hub is transmitted via the slave ring (block 414).

It should be noted that, although the embodiments described herein are described with reference to optical rings, other types of optical path configurations that are known or may become known may also be employed.

An advantage of the embodiments described herein is that they provide L2 protections for both link failure and hub node failure. Moreover, they provide instant switchover to the protection node/ring upon detection of link failure; no timer is required during failure handling.

Another advantage of the embodiments described herein is that control information is only exchanged between hubs. Light weight local operation imposes very light overhead on the network. Additionally, no new hardware or software is required at the nodes; the protocol runs only on the hubs.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method for providing fast protection in a passive optical network ("PON") including two central hubs connected to a provider network and a plurality of network nodes in the PON connected to a first one of the central hubs by a first optical path and to a second one of the central hubs by a second optical path, the method comprising:
   setting the first central hub to master mode, such that only the first central hub transmits data traffic from the provider network to the plurality of network nodes over the first optical path and receives data traffic from the plurality of network nodes over the first optical path, wherein each of the plurality of network nodes are associated with a virtual local area network (VLAN);
   setting the second central hub to slave mode, such the second central hub drops data traffic received from the provider network and the second optical path;
   detecting a failure in the first and second optical paths;
   exchanging status information between the first and second central hubs to determine a status of the first and second optical path;
   determining the first central hub has connectivity to a first set of the plurality of network nodes over the first optical path, wherein the first set of the plurality of network nodes is associated with a first set of VLANs and the second central hub has connectivity to a second set of the plurality of network nodes over the second optical path, wherein the second set of the plurality of network nodes is associated with at a second set of VLANs;
   transmitting by the first central hub data traffic from the provider network associated with the first set of VLANs to the first set of the plurality of network nodes over the first optical path and dropping any data traffic received from the provider network associated with the second set of VLANs; and
   transmitting by the second central hub data traffic from the provider network associated with the second set of VLANs to the second set of the plurality of network nodes over the second optical path and dropping any data traffic received from the provider network associated with the first set of VLANs.

2. The method of claim 1 further comprising:
   detecting a failure in the first optical path;
   exchanging status information between the first and second central hubs;
   if a failure has occurred in the second optical path, setting the first and second central hubs to slave mode and master mode, respectively, such that only the second central hub transmits traffic to and from the network nodes.

3. The method of claim 2 wherein the transmitting by the first central hub traffic to the first set of the network nodes comprises transmitting by the first central hub traffic with VLAN IDs associated with the first set of network nodes.

4. The method of claim 2 wherein the transmitting by the second central hub traffic to the second set of the network nodes comprises transmitting by the second central hub traffic with VLAN IDs associated with the second set of network nodes.

5. The method of claim 1 wherein the status information comprises Ethernet/layer 2 frames.

6. The method of claim 1 wherein the PON is a wavelength division multiplex PON.

7. The method of claim 1 wherein the first and second optical paths comprise first and second optical rings, respectively.

8. A system for implementing a fast protection scheme in a passive optical network ("PON") including two central hubs and a plurality of network nodes, wherein the network nodes are connected to a first of the central hubs by a first optical ring and connected to a second of the central hubs by a second optical ring, the system comprising:
   means for setting the first central hub to master mode and the second central hub to slave mode such that the first central hub transmits data traffic to the network nodes via the first optical ring and the second central hub drops data traffic for the networks nodes;
   means for detecting a failure in the first and second optical rings;
   means for exchanging control messages between the first and second central hubs regarding the ring status of the first and second optical rings and connectivity of network nodes to the first central hub and the second central hub and determining the first central hub has connectivity to the first set of network nodes associated with a first set of VLANs and the second central hub has connectivity to the second set of network nodes associated with a second set of VLANs;
   means for transmitting by the first central hub data traffic associated with a first set of VLANs to the first set of the network nodes associated with the first set of VLANs and dropping data traffic received associated with the second set of VLANs; and
   means for transmitting by the second central hub data traffic to the second set of network nodes associated with the second set of VLANs in response to the failure in the first and second optical rings path and dropping data traffic received associated with the first set of VLANs.

9. The system of claim 8 wherein the means for transmitting by the first central hub traffic to the first set of the network nodes comprises means for transmitting by the first central hub traffic with VLAN IDs associated with the first set of network nodes.

10. The system of claim 9 wherein the control messages comprise Ethernet/L2 frames.

11. The system of claim 9 wherein the PON is a wavelength division multiplex PON.

12. The system of claim 8 wherein the means for transmitting by the second central hub traffic to the second set of the network nodes comprises means for transmitting by the second central hub traffic with VLAN IDs associated with the second set of network nodes.

13. A passive optical network ("PON") for implementing a fast protection scheme, the PON comprising:
   a first central hub connected to a plurality of network nodes via a first optical ring;
   a second central hub connected to the network nodes via second optical ring, the second central hub connected to the first central hub for enabling periodic exchange of ring status information between the hubs;
   wherein the first central hub is set to master mode and the second central hub is set to slave mode such that only the first central hub transmits traffic to and from the network nodes and the second central hub drops data traffic from the network nodes and for the network nodes;

wherein responsive to detection of a failure in the first and second optical rings, the first and second central hubs exchange ring status information to determine ring status of the first and second optical rings and to determine the first central hub has connectivity to a first plurality of network nodes associated with a first set of VLANs via the first optical ring and the second central hub has connectivity to a second plurality of network nodes associated with a second set of VLANs via the second optical ring; and wherein, responsive to detection of a failure in the first and second optical rings, traffic associated with the first set of VLANs is transmitted by the first central hub to and from the first plurality of the network nodes comprising those network nodes still connected to the first central hub via the first optical ring and traffic associated with the second set of VLANs is dropped by the first central hub; and wherein responsive to detection of a failure in the first and second optical rings, traffic associated with the second set of VLANs is transmitted by the second central hub traffic to and from the second plurality of network nodes comprising those network nodes still connected to the second central hub via the second optical ring and traffic associated with the first set of VLANs is dropped by the second central hub.

14. The PON of claim 13 wherein the transmitting by the first central hub traffic to the first plurality of the network nodes comprises transmitting by the first central hub traffic with VLAN IDs associated with the first plurality of network nodes.

15. The PON of claim 13 wherein the transmitting by the second central hub traffic to the second plurality of the network nodes comprises transmitting by the second central hub traffic with VLAN IDs associated with the second plurality of network nodes.

16. The PON of claim 13 wherein the control messages comprise Ethernet/L2 frames.

* * * * *